US009663388B2

(12) United States Patent
Lin et al.

(10) Patent No.: US 9,663,388 B2
(45) Date of Patent: May 30, 2017

(54) METHOD OF USING A SILICATE-CONTAINING STREAM FROM A HYDROCARBON OPERATION OR FROM A GEOTHERMAL SOURCE TO TREAT FLUID TAILINGS BY CHEMICALLY-INDUCED MICRO-AGGLOMERATION

(71) Applicants: Christopher Lin, Calgary (CA); Amitava Sarkar, Calgary (CA); Brian C. Speirs, Calgary (CA); Ren Zhu, Calgary (CA); Stuart R. D. Lunn, Calgary (CA)

(72) Inventors: Christopher Lin, Calgary (CA); Amitava Sarkar, Calgary (CA); Brian C. Speirs, Calgary (CA); Ren Zhu, Calgary (CA); Stuart R. D. Lunn, Calgary (CA)

(73) Assignee: ExxonMobil Upstream Research Company, Spring, TX (US)

( * ) Notice: Subject to any disclaimer, the term of this patent is extended or adjusted under 35 U.S.C. 154(b) by 484 days.

(21) Appl. No.: 14/273,347

(22) Filed: May 8, 2014

(65) Prior Publication Data
US 2015/0041370 A1 Feb. 12, 2015

(30) Foreign Application Priority Data

Aug. 9, 2013 (CA) .................................. 2823459

(51) Int. Cl.
*C02F 1/52* (2006.01)
*C10G 1/04* (2006.01)
*B01D 21/01* (2006.01)

(52) U.S. Cl.
CPC ............... *C02F 1/52* (2013.01); *B01D 21/01* (2013.01); *C02F 1/5236* (2013.01); *C10G 1/045* (2013.01); *C10G 1/047* (2013.01)

(58) Field of Classification Search
CPC .......... B01D 21/01; C10G 1/04; C10G 1/045; C10G 1/047; C02F 1/52; C02F 1/5236
See application file for complete search history.

(56) References Cited

U.S. PATENT DOCUMENTS

| | | | |
|---|---|---|---|
| 3,705,625 A | 12/1972 | Whitten et al. | 166/252 |
| 4,280,559 A | 7/1981 | Best | 166/303 |
| 4,336,235 A * | 6/1982 | Deabriges | C01B 33/32 423/332 |
| 4,344,485 A | 8/1982 | Butler | 166/271 |
| 4,927,498 A | 5/1990 | Rushmere | 162/168.3 |
| 4,954,220 A | 9/1990 | Rushmere | 162/168.3 |
| 5,368,833 A * | 11/1994 | Johansson | C01B 33/149 423/338 |

(Continued)

FOREIGN PATENT DOCUMENTS

| | | | | |
|---|---|---|---|---|
| CA | 1246993 | 12/1988 | ............ | E21B 43/28 |
| CA | 2665350 | 12/2009 | ............ | C02F 11/14 |

(Continued)

*Primary Examiner* — Renee Robinson
(74) *Attorney, Agent, or Firm* — ExxonMobil Upstream Research Company Law Dept.

(57) ABSTRACT

Disclosed is a method for treating oil sands tailings. The tailings are conditioned with an aluminate and treated with a silicate-containing stream from a hydrocarbon operation or from a geothermal source to produce chemically-induced micro-agglomerates (CIMA) and water.

13 Claims, 2 Drawing Sheets

(56) References Cited

U.S. PATENT DOCUMENTS

| | | | | |
|---|---|---|---|---|
| 5,447,604 A * | 9/1995 | Johansson | D21H 17/68 | |
| | | | 106/482 | |
| 5,899,274 A | 5/1999 | Frauenfeld et al. | 166/401 | |
| 6,007,708 A | 12/1999 | Allcock et al. | 208/391 | |
| 6,060,523 A | 5/2000 | Moffett et al. | 516/110 | |
| 6,274,112 B1 | 8/2001 | Moffett et al. | 423/338 | |
| 6,662,872 B2 | 12/2003 | Gutek et al. | 166/272.4 | |
| 6,708,759 B2 | 3/2004 | Leaute et al. | 166/272.4 | |
| 7,931,800 B2 | 4/2011 | Ozum | 208/390 | |
| 8,043,494 B2 | 10/2011 | Ozum | 208/44 | |
| 8,349,188 B2 | 1/2013 | Soane et al. | 210/666 | |
| 8,353,641 B2 | 1/2013 | Berg et al. | 404/72 | |
| 8,388,832 B2 | 3/2013 | Moffett et al. | 208/390 | |
| 2005/0194292 A1 | 9/2005 | Beetge et al. | 208/391 | |
| 2006/0207946 A1 | 9/2006 | McColl et al. | 210/733 | |
| 2009/0095678 A1 | 4/2009 | Musale et al. | 210/638 | |
| 2010/0104744 A1 * | 4/2010 | Moffett | C04B 28/24 | |
| | | | 427/138 | |
| 2010/0126910 A1 | 5/2010 | Moffett et al. | 208/390 | |
| 2010/0187181 A1 | 7/2010 | Sortwell | 210/726 | |
| 2011/0192768 A1 | 8/2011 | Ozum | 208/391 | |
| 2012/0018383 A1 | 1/2012 | Sortwell | | |
| 2012/0318170 A1 | 12/2012 | Moffett et al. | 106/270 | |

FOREIGN PATENT DOCUMENTS

| | | | |
|---|---|---|---|
| CA | 2673981 | 1/2010 | B01D 21/01 |
| CA | 2673982 | 1/2010 | B01D 21/01 |
| CA | 2649928 | 7/2010 | B01D 21/01 |
| CA | 2667933 | 7/2010 | B01D 21/01 |
| CA | 2666025 | 11/2010 | B01D 17/22 |
| CA | 2735330 | 4/2011 | B03D 3/06 |
| CA | 2515581 | 7/2011 | C02F 11/00 |
| CA | 2780852 | 6/2011 | B01F 7/24 |
| CA | 2788671 | 8/2011 | B65G 53/30 |
| CA | 2788721 | 8/2011 | C22B 1/244 |
| CA | 2803904 | 2/2012 | C02F 1/28 |

* cited by examiner

METHOD OF USING A SILICATE-CONTAINING STREAM FROM A HYDROCARBON OPERATION OR FROM A GEOTHERMAL SOURCE TO TREAT FLUID TAILINGS BY CHEMICALLY-INDUCED MICRO-AGGLOMERATION

CROSS REFERENCE TO RELATED APPLICATIONS

This application claims the priority benefit of Canadian Patent Application Number 2,823,459 filed Aug. 9, 2013 entitled METHOD OF USING A SILICATE-CONTAINING STREAM FROM A HYDROCARBON OPERATION OR FROM A GEOTHERMAL SOURCE TO TREAT FLUID TAILINGS BY CHEMICALLY-INDUCED MICRO-AGGLOMERATION, the entirety of which is incorporated by reference herein.

FIELD

The present disclosure relates generally to the field of processing of mined oil sands. More particularly, the present disclosure relates to the treatment of tailings from an oil sands bitumen extraction process that generates tailings comprising fine particles such as clays.

BACKGROUND

Fluid tailings streams are typically by-products of mining operations that are composed of water and solid particles. In order to recover the water and consolidate the solids, solid/liquid separation techniques must be applied. In oil sands processing, there are different fluid tailings streams with different compositions. For example, a typical fresh tailings stream comprises water, sand, silt, clay, and residual bitumen. However, if the tailings stream is derived from a froth treatment process, it will also comprise residual solvents and other hydrocarbonaceous materials (e.g. asphaltenes).

Oil sands tailings typically comprise a substantial amount of fine particles (defined as solids that are less than 44 microns) and clays. The bitumen extraction process uses hot water and chemical additives such as sodium hydroxide or sodium citrate to remove the bitumen from the solid particles. The side effect of these chemical additives is that they change the inherent water chemistry and thus the solids in the aqueous phase acquire a negative charge. Due to strong electrostatic repulsion, the fine particles form a stabilized suspension that does not settle by gravity, even after a considerable amount of time. In fact, if the suspension is left alone for 3-5 years, a gel-like layer known as mature fine tailings (MFT) will be formed and this type of tailings is very difficult to consolidate even with current technologies.

In oil sands tailings treatment, various types of polyacrylamides (PAM) have been tested for the flocculation of tailings solids. While polyacrylamides are generally useful for fast consolidation of tailings solids, they are not selective towards fine particles and clays. As a result, the water recovered from a PAM consolidation process is rarely good enough for recycling because of high fines content in the water. Therefore, this water needs to be placed in a tailings pond where the fine particles eventually turn into MFT. Additionally, tailings treated with PAM are shear sensitive so transportation of thickened tailings to a dedicated disposal area (DDA) and general materials handling can become a challenge.

US Patent Application Publication No. 2010-0187181 (Sortwell) describes the use of zeolite to assist in the dispersion of components in aqueous mineral slurries to release and separate individual components of the slurry. Upon dispersion, Sortwell describes a process to consolidate residual mineral solids using multivalent cations and PAM.

US Patent Application Publication No. 2010-0126910 (Moffett et al.) describes the treatment of a tailings stream by contacting it with a polysilicate microgel, a polyacrylamide, a multivalent metal compound and/or a low molecular weight cationic organic polymer.

The synthesis of polysilicate microgel was described in a series of patents, including for example, U.S. Pat. No. 4,927,498 (Rushmere), U.S. Pat. No. 4,954,220 (Rushmere), U.S. Pat. No. 6,060,523 (Moffett et al.) and U.S. Pat. No. 6,274,112 (Moffett et al.).

Canadian Patent No. 2 515 581 and US Patent Application Publication No. 2006-0207946 (Scammell et al.) describe a process in which material comprising an aqueous liquid with dispersed particulate solids is transferred as a fluid to a deposition area, then allowed to stand and rigidify, in which rigidification is improved with an effective rigidifying amount of aqueous solution of a water-soluble polymer.

SUMMARY

It is an object of the present disclosure to obviate or mitigate at least one disadvantage of previous systems or methods.

Disclosed is a method for treating oil sands tailings. The tailings are conditioned with an aluminate and treated with a silicate-containing stream from a hydrocarbon operation or from a geothermal source to produce chemically-induced micro-agglomerates (CIMA) and water.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the disclosure will become apparent from the following description, appending claims and the accompanying drawings, which are briefly described below.

Figure 1:
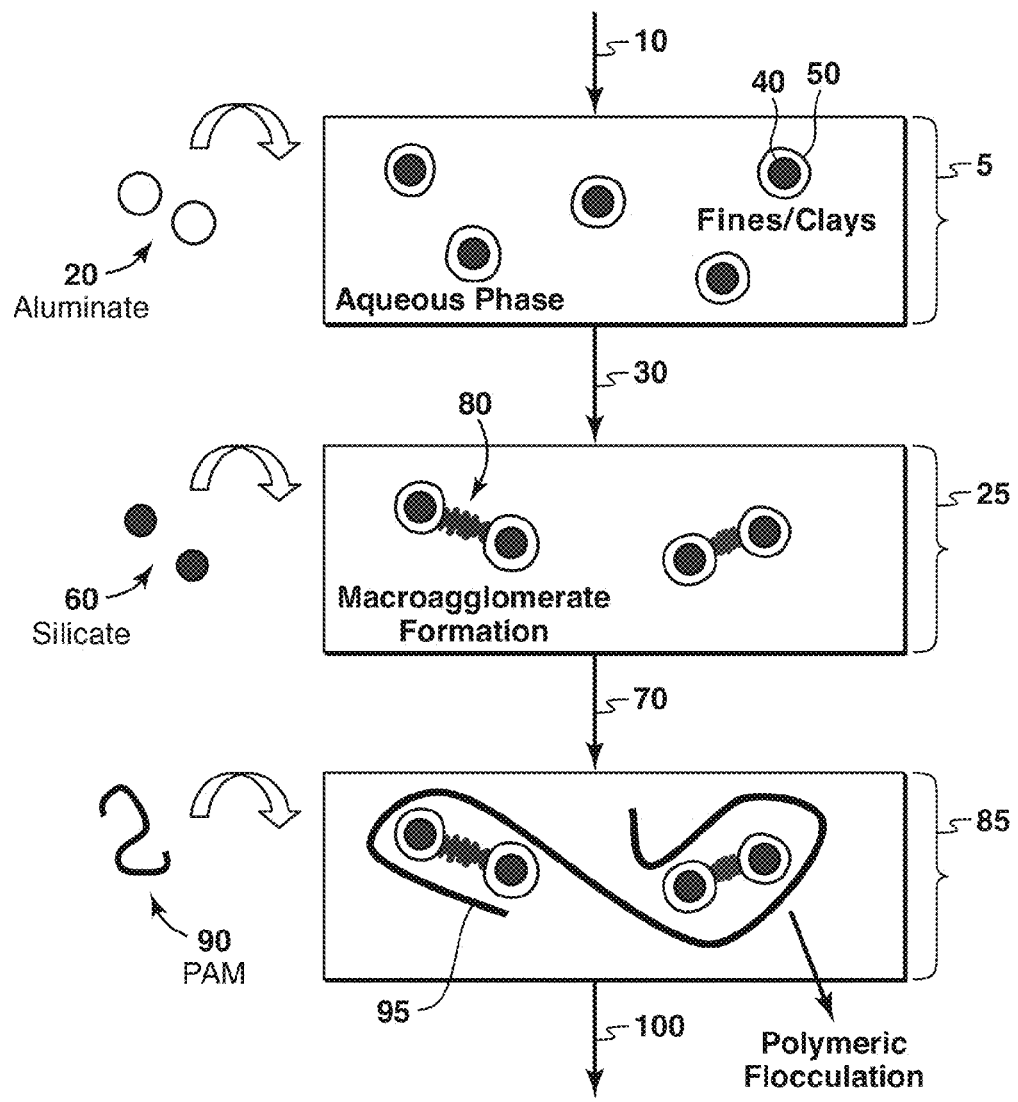
FIG. 1 is a simplified flow diagram illustrating an overview of a method of forming CIMAs.

It should be noted that the figures are merely examples and no limitations on the scope of the present disclosure are intended thereby. Further, the figures are generally not drawn to scale, but are drafted for purposes of convenience and clarity in illustrating various aspects of the disclosure.

DETAILED DESCRIPTION

Generally, the present disclosure provides a method for treating oil sands tailings. The tailings are conditioned with an aluminate and treated with a silicate-containing stream from a hydrocarbon operation or from a geothermal source to produce CIMAs and water.

The present disclosure provides a process in which CIMAs of fine particles are formed in the fluid tailings stream. Micro-agglomerates are predominately much less than 1 mm in diameter, with the majority between 2 and 100 microns, and they principally comprise fine particles of the oil sands. The CIMAs, when combined with a typical PAM, can enhance tailings flocculation and dewatering, and lead to an increase in the strength of the tailings deposit. Simply put, the tailings deposit following the CIMA process generally has a greater strength than PAM treated tailings. The disclosed process allows water recycling (for example to an extraction process) to be an option and may reduce the size of the tailings pond significantly by increasing the dewatering of the tailings.

The present disclosure may provide a method for treating a tailings stream from an oil sands bitumen extraction process, the tailings stream comprising fine particles and clays, the method including conditioning the tailings stream with an aluminate to produce a conditioned tailings stream, and treating the conditioned tailings stream with a silicate-containing stream from a hydrocarbon operation or from a geothermal source to produce a treated tailings stream comprising CIMAs and water.

The aluminate may comprise sodium aluminate. The aluminate may be selected from the group consisting of potassium aluminate, aluminum sulfate, aluminum oxide, aluminum chloride, polyaluminum chloride, polyaluminum sulfate, and mixtures thereof. The aluminate may include an aluminate complex.

The silicate-containing stream from a hydrocarbon operation may be one of the following four streams: a thermal in-situ waste stream, a thermal in-situ non-waste stream, a hydrocarbon mining stream and a stream from a geothermal source.

A "thermal in-situ waste stream" is a stream that is considered a waste stream from a hydrocarbon production operation where heat is used to assist or enable hydrocarbon production. Such streams would generally be of low value, and would commonly be disposed of, and optionally treated, prior to disposal. Examples include boiler blowdown water, evaporator blowdown water, boiler in series blowdown water, waste streams such a sludge or lagoon supernatant, and water for evaporators or crystallizers. Such streams generally have high silica and TDS (total dissolved solids) contents and are commonly turned into cakes or disposed of in a well. Using a waste stream may be particularly attractive because of its low value.

A "thermal in-situ non-waste stream" is a stream that is not considered a waste stream from a hydrocarbon production operation where heat is used to assist or enable hydrocarbon production. Examples include raw produced water, de-oiled or partially de-oiled produced water, and softened or partially softened produced water. Produced water is generally not considered a waste stream because it is commonly purified and recycled into an in-situ process as steam. One type of thermal in-situ hydrocarbon production is a thermal in-situ oil sands operation, which is discussed in more detail below. By way of example only, one well-known commercial in-situ oil sands operation is SAGD (solvent-assisted gravity drainage). In a SAGD process, steam is injected into the ground to reduce the viscosity of the in-situ bitumen to permit bitumen production. Water is also produced and is separated from the bitumen to form "produced water". Produced water comprises silicates, which are generally considered undesirable. However, as disclosed herein, produced water may be used as a silicate source for the CIMA process. An alternative would be to use commercial grade colloidal silica, which could be expensive given the high volume involved. Experiments detailed below showed that such silicate-containing produced water was effective for treating tailings.

A "hydrocarbon mining stream" is a stream that stems from a hydrocarbon mining extraction operation. Examples include kettle boiler streams, and drum boiler blowdown water from an oil sands mining operation.

The fourth stream is a stream from a "geothermal source". It is known that thermal energy has the ability to "leach" silicate compounds from natural minerals and geological formations. Therefore, streams with a high enough silicate content from geothermal sources could be a potential silicate source for CIMA.

Suitable silicate-containing streams will have a high enough silicate content to achieve the desired treatment to form suitable agglomerates (for instance, greater than 50 wppm Si). Suitable silicate-containing streams will also have low enough TDS so as not to hinder the CIMA process to an unacceptable extent (for instance, less than 2000 wppm).

Treating the conditioned tailings stream may comprise mixing to enhance agglomerate formation. Mixing may be provided by transportation through a pipeline.

The method may include adding an organic agglomerating polymer after the formation of the CIMA to produce a flocculated tailings stream. The organic agglomerating polymer may include a flocculating polymer. The flocculating polymer may comprise a PAM. The organic agglomerating polymer may be selected from the group consisting of: a cationic, anionic, nonionic or amphoteric polyacrylamide, a copolymer of acrylamide and diallyl dimethyl ammonium chloride, a copolymer of acrylamide and diallylaminoalkyl (meth)acrylates, a copolymer of acrylamide and dialkyl-diaminoalkyl (meth)acrylamide, and mixtures thereof.

The method may include discharging the flocculated tailings stream to a DDA. Water may be collected from the DDA for recycling.

The tailings stream may be alkaline. The tailings stream may include coarse sand tailings or fine tailings, or a combination of coarse sand tailings and fine tailings.

The tailings stream may comprise flotation or middling tailings. The tailings stream may comprise froth treatment tailings. The tailings stream may comprise MFT. The tailings stream may comprise Thickened Tailings (TT). The tailings stream may comprise Primary Separation Vessel (PSV) or Coarse Tailings.

The tailings stream may be treated with 10 to 2000 ppmw sodium aluminate (SA), 10-2000 ppmw silicate (S), and 50-1000 ppmw polyacrylamide PAM. The tailings stream may be treated with 200-1000 ppmw SA, 20-100 ppmw S, and 100-1000 ppmw PAM. The tailings stream may be treated at a temperature in a range of 10° C. to 40° C.

The tailings stream may be treated with 10-1000 ppmw SA, 10-1000 ppmw S, and 25-500 ppmw PAM. The tailings stream may be treated with 10 ppmw SA, 10 ppmw S, and 50-100 ppmw PAM. The tailings stream may be treated at a temperature in a range of 60° C. to 95° C.

The tailings stream may treated with 10-4000 ppmw SA, 10-4000 ppmw S, and 100-2000 ppmw PAM. The tailings stream may be treated with 1000-2000 ppmw SA, 100-2000 ppmw S, and 500-2000 ppmw PAM. The tailings stream may be treated at a temperature in a range of 5° C. to 30° C. The tailings stream may be treated at a temperature in a range of 5° C. to 20° C.

The method may include diluting the MFT with water prior to treating the tailings stream.

The tailings stream may be treated with 10-2000 ppmw SA, 10-2000 ppmw S, and 50-1000 ppmw PAM. The tailings stream may be treated with 200-1000 ppmw SA, 20-100 ppmw S, and 100-1000 ppmw PAM. The tailings stream may be treated at a temperature in a range of 10° C. to 40° C.

The tailings stream may be treated with 10-1000 ppmw SA, 10-1000 ppmw S, and 10-500 ppmw PAM. The tailings stream may be treated with 10 ppmw SA, 10 ppmw S, and 10-200 ppmw PAM. The tailings stream may be treated at a temperature in a range of 20° C. to 40° C.

The method may include increasing the alkalinity of the tailings stream prior to conditioning the tailings stream.

The method may include conditioning or treating or both conditioning and treating the tailings stream with a tailings treating technology. The tailings treating technology may be selected from the group of thickening, centrifugation, and in-line flocculation. The method may include following the tailings treating technology with thin or thick lift drying.

CIMAs of fine particles may be produced in a fluid tailings stream. Such agglomerates may be used to enhance overall tailings flocculation and dewatering. The CIMAs may be formed by an in-situ chemical reaction that binds the fine particles together (including clays). The CIMA process enhances the quality of the discharged water and creates chemically-bonded microstructures of fine particles that are stronger and more shear resistant than traditional flocs formed by physical consolidation.

The process of generating CIMAs of fine tailings involves forming a chemical bond between the fine particles and clays.

Referring to FIG. 1, in a conditioning stage 5, a tailings stream 10 from an oil sands bitumen extraction process may be conditioned with an aluminate 20, for instance sodium aluminate (or similar aluminum species, including but not limited to, potassium aluminate, aluminum sulfate, aluminum oxide, aluminum chloride, polyaluminum chloride, or polyaluminum sulfate) to produce a conditioned tailings stream 30. In alkaline environments (e.g. oil sands tailings), fine particles and clays 40 carry a negative charge characterized by a negative zeta potential. Aluminate complexes can neutralize the negative charge and form a layer of coating 50 around the fine particles and clays 40. When this occurs, natural coagulation begins due to van der Waals interactions.

After the conditioning stage 5, the conditioned tailings stream 30 may be treated, in a treating stage 25, with a silicate 60 to produce treated tailings 70. In the treating stage 25, a series of polycondensation reactions begin to occur as soluble silicates react instantaneously or quickly with aluminate complexes to form a stable, chemical bond. The net effect of this in-situ bonding is the rearrangement of the fine particles and clays 40 into a CIMA 80.

After the formation of the CIMA 80, a flocculent, such as a PAM 90 may be added to the treated tailings 70, in a flocculating stage 85, to increase the settling rate and allow dense, "macro-agglomerates" 95 of particles to form through polymeric flocculation to produce a flocculated tailings stream 100.

The aluminate may be added before, or concurrently with silicate-containing produced water. The silicate-containing produced water may be added before, or concurrently with the aluminate.

The flocculent may be any suitable organic agglomerating polymer, including but not limited to, any cationic, anionic, nonionic or amphoteric polyacrylamides, a copolymer of acrylamide and diallyl dimethyl ammonium chloride, a copolymer of acrylamide and diallylaminoalkyl (meth)acrylates, and a copolymer of acrylamide and dialkyldiaminoalkyl (meth)acrylamide.

As used herein, the flocculated "macro-agglomerates" are generally greater than 500 microns, up to millimeters in size. These "macro-agglomerates" comprise both the fine particles (less than 44 microns) and sand grains of the oil sands. The addition of the PAM 90 increases the overall dewatering rate due to enhanced settling rate.

The method described herein provided enhanced quality of water discharged from the flocculated tailings stream 100 and the chemically-bonded microstructures of fine particles are stronger and more shear resistant than flocs formed by a typical PAM without conditioning and treating to form the CIMA 80.

The method described herein for tailings flocculation and dewatering may be used in relation to various tailings treating technologies including thickening, centrifugation, and in-line flocculation followed by thin or thick lift drying. Due to the robustness of the method described herein, the method may be applied to various oil sands tailings streams including flotation/middling tailings, froth treatment tailings (including paraffinic froth treatment (PFT) or naphthenic froth treatment (NFT)), mature fine tailings (MFT), primary separation vessel (PSV)/coarse tailings, and thickened tailings (TT).

Figure 2:
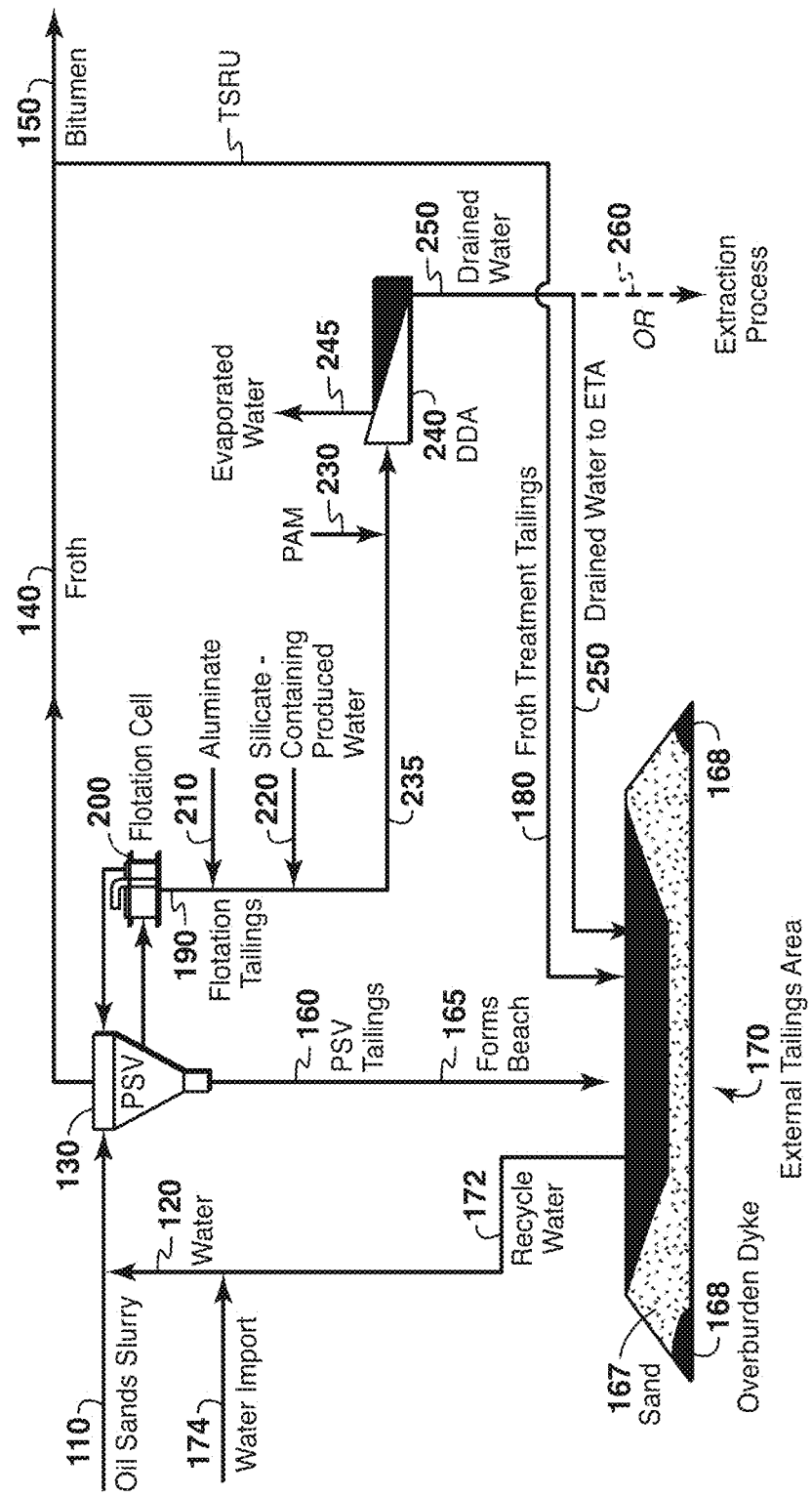
FIG. 2 is a simplified flow diagram illustrating an overview of in-line flocculation of flotation tailings using the disclosed CIMAs process.

In-line flocculation of flotation tailings using the method described herein is illustrated in FIG. 2, in context with a known process for extracting bitumen from oil sands.

Referring to FIG. 2, an oil sands slurry 110, with water 120 may be conveyed to a Primary Separation Vessel (PSV) 130 where, through known processes, froth 140 carries bitumen 150 for recovery. PSV tailings 160, which are relatively coarse sand tailings, are collected in an external tailings area (ETA) 170, tending to form what is referred to as a beach 165 comprising sand 167. An overburden dyke 168 holds the sand 167 in place. Recycle water 172 may be recovered from the ETA 170 and be recycled as a source of water 120. Import water 174 may also provide a source of water 120.

Froth treatment tailings 180 from a Tailings Solvent Recovery Unit (TSRU) may be also collected in the external tailings area 170. Flotation tailings 190 from flotation cell 200 may be treated using the method disclosed herein.

Aluminate 210, silicate-containing produced water 220 and PAM 230 may be added in sequence, for example by pumping, injection, or otherwise, into a pipeline 235 extending between the flotation cell 200 and a dedicated disposal area (DDA) 240 where the flocculated tailings are discharged. Between 100 ppmw and 1000 ppmw of sodium aluminate, which represents 100 and 1000 g/T of dry tailings, silicate of between 10 and 1000 ppmw with respect to dry tails (introduced via silicate-containing produced water), and PAM of between 50 and 500 ppmw with respect to dry tails may be added.

The aluminate 210 and PAM 230 may also be added as aqueous solutions. The concentration of sodium aluminate (the source of aluminate) may be about 1 wt %. This means 1 g of sodium aluminate solid in 99 g of distilled water. The mixture may be well mixed and added to the tailings. PAM 230 generally comes as solids and is mixed with water. PAM 230 solution, having a concentration of between about 0.1 wt % and about 0.5 wt % solution, may be used.

Flotation and middling tailings, froth treatment tailings, mature fine tailings, thickened tailings, PSV/coarse tailings, or combinations thereof, may be treated according to the following formulations, which are examples only.

PSV/Coarse tailings may be treated at a temperature between about 20° C. and about 40° C.

The high shear within the pipeline 235 provides mixing to enhance agglomerate formation. A portion of water from the DDA 240 may evaporate as evaporated water 245. Drained water 250 may be drained or otherwise captured from the DDA 240 and may be used for an extraction process 260 or other re-use or heat recovery, or a combination thereof, or sent to the ETA 170 for storage.

While the method described herein has been described in detail with respect to flotation tailings 190, it may similarly also be applied to PSV tailings 160 or froth treatment tailings 180, or other oil sands tailings, or combinations thereof.

Utilizing the method described herein, in-line flocculation directly treats fresh tailings and can reduce or potentially eliminate the formation of MFT.

Silicate-Containing Stream

By way of background, "silicates" are a class of compounds of which silica is a member. "Silica" is also known as silicon dioxide.

The amount of silicate used may be selected depending on the type of tailings been treated, and may be, for instance, 10-4000 ppmw based on the weight of dry tails. Additionally, the process can accommodate a wide range of silicate concentrations in the produced water since the process can accommodate more or less produced water. If less water is desired, the produced water could be diluted with another aqueous source, for instance another produced water stream with a lower silicate concentration.

For this process, silicate concentrations in the produced water could be, for instance, 10-10,000 ppmw, or may be 50-1,000 ppmw, but may also be outside of these ranges.

Ideally, the silicate-containing stream will not introduce an amount of total dissolved solids (TDS), for instance sodium compounds that will unduly interfere with the tailings treatment or subsequent extraction using recycled water.

The produced water used may be raw produced water or may be processed prior to its introduction into the CIMA process. For instance, the produced water may be de-oiled or partially de-oiled produced water, or softened or partially softened water.

While the produced water could be treated to remove contaminants, so long as the contaminants do not unduly interfere with the tailings treatment, for economic reasons and all else being equal, it would generally be wise to use produced water that has not been unnecessarily cleaned, for instance water that would otherwise be suitable for steam generation in an SAGD operation.

Produced water from thermal in-situ oil sands processes (e.g. SAGD and CSS) commonly has a silicate content that approaches 300 ppmw. Produced water treatment from in-situ operations to prepare boiler-feed-water (BFW) for stream generation in once through steam generators (OTSG) typically involves the use of a skim tank, induced gas flotation (IGF), hot/warm lime softening (HLS/WLS), and weak acid cation exchange (WAGS) softening.

Due to the robustness of the LIMA process, various produced water streams with a high enough silicate content from all thermal in-situ operations and geothermal sources can be a potential silicate source for LIMA.

It is known that thermal energy has the ability to "leach" silicate compounds from natural minerals and geological formations. Therefore, any water streams with a high enough silicate content from thermal in-situ operations and/or geothermal sources could be a potential silicate source for LIMA.

For example, the OTSG blowdown from SAGD operations (typically a waste stream with residual heat content) may be a good stream for integration with LIMA because using this stream may reduce wastewater management requirements in a SAGD operation. Other suitable streams may include HLS feed and outlet streams where silicate contents are typically in the range of 250 to 300 ppmw and 30 to 150 ppmw, respectively.

As shown in the Examples section below, the silicate-containing produced water from an in-situ oil sands process was found to be effective in the LIMA process. This integrative process may be an attractive option to reduce LIMA operating expenses and/or to improve wastewater management in in-situ operations.

Water treatment technologies using IGF, HLS, and WAGS are well documented. The primary chemical reactions associated with HLS are: lime softening, caustic softening, soda ash softening, and alkalinity reduction. Most of these reactions result in precipitation of calcium carbonate and magnesium hydroxide that leads to a reduction in water hardness. Silica enters the HLS as very small particulates that cannot be effectively filtered from the water in the sludge bed or in the WAGS afterfilters. Silica is reduced in the HLS through the physical process of adsorption. Silica, present in the HLS as negatively-charged colloids, is adsorbed on the positively-charged magnesium hydroxide present in the system. The outlet stream from the HLS typically contains greater than 30 ppmw of silica which becomes a component of the BFW.

EXAMPLES

Lab-scale proof of concept studies confirmed that the silica present in the in-situ process water can be used in the LIMA process. In Experiment 1, LIMA was formulated with commercial colloidal silica and was used to treat fluid tailings. In Experiment 2, LIMA was formulated with treated produced water from a CSS operation in the Cold Lake area of Alberta and used to treat the same tailings. In both LIMA experiments, the chemical dosages were the same and the performance data were comparable. A comparative example using only a single flocculant was conducted and it is clear that the performance of a single flocculant was not as desirable as CIMA using commercial colloidal silica or silicate-containing produced water.

Lab Data:

As a proof-of-concept, treated produced water from Cold Lake with a silica content of 24 ppm and a TDS of 47 ppm was used in Experiment 2. The chemical dosage for each experiment is outlined below:

|  | Flotation Tailings (g) | Sodium Aluminate (g/T tailings) | Silica (g/T tailings) | PAM (g/T tailings) |
| --- | --- | --- | --- | --- |
| Experiment 1 | 150 | 800 | 100 | 250 |
| Experiment 2 | 150 | 800 | 100 | 250 |
| Comparative | 150 | N/A | N/A | 250 |

|  | Experiment 1: CIMA (using commercial colloidal silica) | Experiment 2: CIMA (using produced water from an in-situ process) | Comparative Experiment: Single Flocculant |
| --- | --- | --- | --- |
| Supernatant turbidity (NTU) | 60.5 | 69.8 | 282 |
| Initial yield stress of tailings deposit (Pa) | 357 | 334 | 120 |

In-Situ Oil Sands Operations

In order to provide further context to the produced water used herein as a silicate source, a brief description of in-situ oil sands processes will now be provided.

Where deposits lie well below the surface, bitumen may be extracted using in-situ ("in place") techniques. One example of an in-situ technique is the steam-assisted gravity drainage method (SAGD). In SAGD, directional drilling is employed to place two horizontal wells in the oil sands, a lower well and an upper well positioned above it. Steam is injected into the upper well to heat the bitumen and lower its viscosity. The bitumen and condensed steam will then drain downward through the reservoir under the action of gravity and flow into the lower production well, whereby these liquids can be pumped to the surface. At the surface of the well, the condensed steam and bitumen are separated, and the bitumen is diluted with appropriate light hydrocarbons for transport to a refinery or an upgrader. An example of SAGD is described in U.S. Pat. No. 4,344,485 (Butler).

In other processes, such as in Cyclic Steam Stimulation (CSS), the same well is used both for injecting a fluid and for producing oil. In CSS, cycles of steam injection, soak, and oil production are employed. Once the production rate falls to a given level, the well is put through another cycle of injection, soak, and production. An example of CSS is described in U.S. Pat. No. 4,280,559 (Best).

Steam flood (SF) involves injecting steam into the formation through an injection well. Steam moves through the formation, mobilizing oil as it flows toward the production well. Mobilized oil is swept to the production well by the steam drive. An example of steam flooding is described in U.S. Pat. No. 3,705,625 (Whitten).

Other thermal processes include Solvent-Assisted Steam Assisted Gravity Drainage (SA-SAGD), an example of which described in Canadian Patent No. 1,246,993 (Vogel); Vapour Extraction (VAPEX), an example of which is described in U.S. Pat. No. 5,899,274 (Frauenfeld); Liquid Addition to Steam for Enhanced Recovery (LASER), an example of which is described in U.S. Pat. No. 6,708,759 (Leaute et al.); and Combined Steam and Vapour Extraction Process (SAVEX), an example of which is described in U.S. Pat. No. 6,662,872 (Gutek), and derivatives thereof.

Flotation and Middling Tailings

Flotation/middling tailings may be treated according to the recipe: 10 to 2000 ppmw SA; 10-2000 ppmw S; and 50-1000 ppmw PAM. Flotation/middling tailings may be treated according to the recipe: 200-1000 ppmw SA; 20-100 ppmw S; and 100-1000 ppmw PAM.

Flotation/middling tailings may be treated at a temperature between about 10° C. and about 40° C.

Froth Treatment Tailings (PFT and NFT)

Froth treatment tailings may be treated according to the recipe: 10-1000 ppmw SA; 10-1000 ppmw S; and 25-500 ppmw PAM. Froth treatment tailings may be treated according to the recipe: 10 ppmw SA; 10 ppmw S; and 50-100 ppmw PAM.

Froth treatment tailings may be treated at a temperature between about 60° C. and about 95° C.

Mature Fine Tailings (MFT)

MFT may be treated according to the recipe: 10-4000 ppmw SA; 10-4000 ppmw S; and 100-2000 ppmw PAM-MFT may be treated according to the recipe: 1000-2000 ppmw SA; 100-2000 ppmw S; and 500-2000 ppmw PAM.

MFT may be treated at a temperature between about 5° C. and about 30° C. The temperature may be between about 5° C. and about 20° C. Water may be used to dilute the MFT prior to treatment.

Thickened Tailings (TT)

TTs may be treated according to the recipe: 10-2000 ppmw SA; 10-2000 ppmw S; and 50-1000 ppmw PAM. TTs may be treated according to the recipe: 200-1000 ppmw SA; 20-100 ppmw S; and 100-1000 ppmw PAM.

TTs may be treated at a temperature between about 10° C. and about 40° C.

PSV/Coarse Tailings

PSV/Coarse Tailings may be treated according to the recipe: 10-1000 ppmw SA; 10-1000 ppmw S; and 10-500 ppmw PAM. PSV/course tailings may be treated according to the recipe: 10 ppmw SA; 10 ppmw S; and 10-200 ppmw PAM.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

It should be understood that numerous changes, modifications, and alternatives to the preceding disclosure can be made without departing from the scope of the disclosure. The preceding description, therefore, is not meant to limit the scope of the disclosure. Rather, the scope of the disclosure is to be determined only by the appended claims and their equivalents. It is also contemplated that structures and features in the present examples can be altered, rearranged, substituted, deleted, duplicated, combined, or added to each other.

The articles "the", "a" and "an" are not necessarily limited to mean only one, but rather are inclusive and open ended so as to include, optionally, multiple such elements.

What is claimed is:

1. A method for treating a tailings stream from an oil sands bitumen extraction process, the tailings stream comprising fine particles and clays, the method comprising:
   conditioning the tailings stream with an aluminate to produce a conditioned tailings stream; and
   treating the conditioned tailings stream with a silicate-containing stream from a hydrocarbon operation, to produce a treated tailings stream comprising chemically-induced micro-agglomerates and water;
   wherein the silicate-containing stream from a hydrocarbon operation is a thermal in-situ waste stream, a thermal in-situ non-waste stream, or a stream that stems from a hydrocarbon mining stream.

2. The method of claim 1, wherein the silicate-containing stream has a silicate concentration of 10-10,000 ppmw.

3. The method of claim 1, wherein the silicate-containing stream has a silicate concentration of 50-1,000 ppmw.

4. The method of claim 1, wherein the silicate-containing stream from a hydrocarbon operation is a thermal in-situ waste stream.

5. The method of claim 4, wherein the thermal in-situ waste stream is boiler blowdown water, evaporator blowdown water, boiler in series blowdown water, sludge, lagoon supernatant, or water from evaporators or crystallizers.

6. The method of claim 1, wherein the silicate-containing stream from a hydrocarbon operation is a thermal in-situ non-waste stream.

7. The method of claim 1, wherein the silicate-containing stream from a hydrocarbon operation is a stream that stems from a hydrocarbon mining extraction operation.

8. The method of claim 7, wherein the silicate-containing stream is a kettle boiler stream or a drum boiler blowdown stream.

9. The method of claim 1, wherein the aluminate comprises sodium aluminate.

10. The method of claim 1, wherein the aluminate is selected from the group consisting of potassium aluminate, aluminum sulfate, aluminum oxide, aluminum chloride, polyaluminum chloride, polyaluminum sulfate, and mixtures thereof.

11. The method of claim 1, wherein the treating the conditioned tailings stream comprises mixing to enhance agglomerate formation, wherein the mixing is provided by transportation through a pipeline.

12. The method of claim 1, further comprising adding an organic agglomerating polymer after the formation of the chemically-induced micro-agglomerates to produce a flocculated tailings stream.

13. The method of claim 1, wherein the tailings stream comprises coarse sand tailings, fine tailings, flotation tailings, middling tailings, froth treatment tailings, mature fine tailings, Thickened Tailings, or primary separation vessel tailings or coarse tailings.

\* \* \* \* \*